(12) United States Patent
Bartz

(10) Patent No.: US 6,312,039 B1
(45) Date of Patent: Nov. 6, 2001

(54) ERGONOMIC ACCELERATOR BLOCK

(76) Inventor: William R. Bartz, 977 Arnold Way, San Jose, CA (US) 95128

( * ) Notice: Subject to any disclaimer, the term of this patent is extended or adjusted under 35 U.S.C. 154(b) by 0 days.

(21) Appl. No.: 09/469,731

(22) Filed: Dec. 21, 1999

(51) Int. Cl.$^7$ .................................................. B60N 3/06
(52) U.S. Cl. ............................................................ 296/75
(58) Field of Search ................................... 296/75, 97.23; 180/90.6

(56) References Cited

U.S. PATENT DOCUMENTS

| | | | |
|---|---|---|---|
| 1,316,180 | * 9/1919 | Peden | 296/75 |
| 1,431,623 | * 10/1922 | Berstein | 296/75 |
| 1,951,284 | * 3/1934 | Kramer | 180/90.6 |
| 1,981,148 | * 11/1934 | Muench | 296/75 |
| 2,136,980 | * 11/1938 | Pim | 180/90.6 |
| 3,114,272 | * 12/1963 | Sawyer | 296/97.23 |
| 4,984,838 | * 1/1991 | Kim | 296/75 |
| 4,991,900 | * 2/1991 | White | 296/75 |
| 5,312,151 | * 5/1994 | Krahn | 296/75 |

FOREIGN PATENT DOCUMENTS 2563-480-A * 4/1984 (FR) ..................................... 296/75

* cited by examiner

Primary Examiner—Stephen T. Gordon
Assistant Examiner—Scott Carpenter
(74) Attorney, Agent, or Firm—Donald R. Boys, Central Coast Patent Agency, Inc.

(57) ABSTRACT

An accelerator block for supporting a driver's foot and leg in application to an accelerator pedal in an ergonomically advantageous position has a body with a height, fastened to a floor before the accelerator pedal. The drivers foot rests by the heel on the body, allowing a more obtuse angle between the foot and the leg than would otherwise attain. In some cases a radiused shoulder is provided for the heel, to prevent the heel from slipping back away from the accelerator pedal.

8 Claims, 4 Drawing Sheets

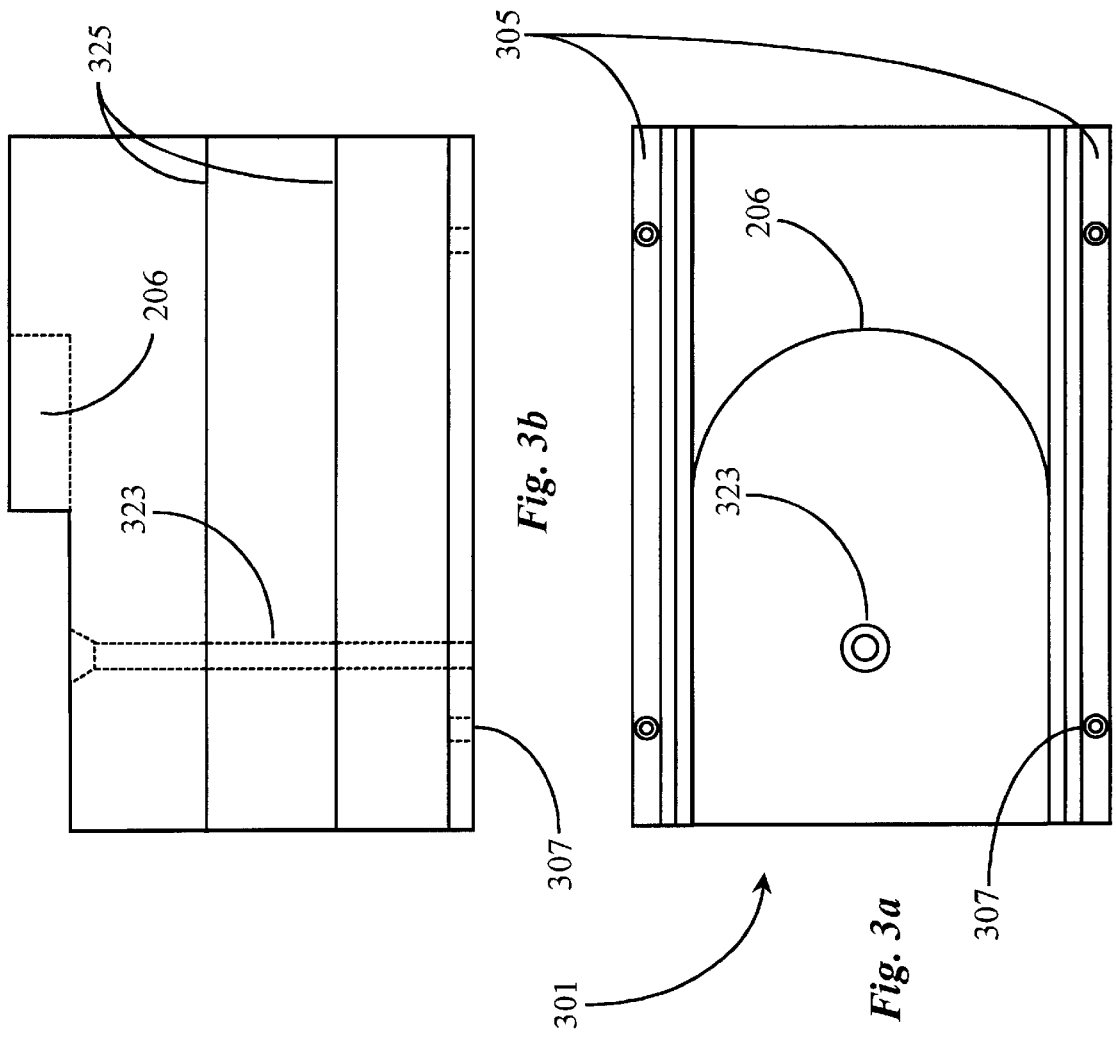

ERGONOMIC ACCELERATOR BLOCK

FIELD OF THE INVENTION

This invention is in the field of ergonomic devices, and has particular application in providing an improved ergonomic environment for a user driving a motor vehicle.

BACKGROUND OF THE INVENTION

The invention provided is designed to alleviate problems related to the incorrect positioning of the leg and foot of a user while driving a recreational vehicle or similar vehicle. A recreational vehicle, commonly referred to as motor home or by its acronym RV, is a van or utility vehicle used for recreational purposes, such as camping, and such vehicles are often equipped with living facilities.

The type of recreational vehicle described above is typically much larger in overall dimensions and weight and provides a greater clearance between the bottom of the chassis of the vehicle and the ground than that of a typical passenger vehicle. The larger dimensions of the recreational vehicle are necessary to accommodate the many features and facilities that are often present, and to allow persons within to freely move about the cabin area in a more upright standing position. The increased ground clearance is caused by greater resistance provided by a stiffer suspension system providing for travel in off-road areas, for example, that contain obstacles on or protruding from the ground that may otherwise prohibit a vehicle with lower ground clearance to safely pass. The stiffer suspension system is also necessary for bearing the additional weight of a large vehicle of the type described above.

The type of vehicle described above also typically has an accelerator pedal and brake pedal mounted pivotally to the floor in front of the driver's seat and in a forward position close to the firewall. The pedals are connected by various means to apparatus extending beyond the firewall and connected to other apparatus for the purpose of manually operating the accelerator and braking functions of the vehicle. The vehicle described also typically has a seat mounted to the floor of the vehicle in a position that allows the driver, when seated forward, to obtain forward and side views of the areas inside and outside the vehicle, and to actuate the steering wheel and accelerator and brake pedals as well as other controls necessary for operating the vehicle.

The seat upon which the driver sits when in such a vehicle is typically higher in dimensions, and often mounted to the floor in a position closer to the front firewall and accelerator and brake pedals of the vehicle than might be expected in a regular passenger vehicle. The forward mounting position of the seat is necessary to provide the seated driver a position close enough to the windshield to allow an adequate view over the dashboard, through the windshield and down to the ground or pavement outside the vehicle. A forward mounting position of the seat as described above is typical in such a vehicle with greater ground clearance and overall dimensions.

One problem with a forward mounting position of a driver's seat as described above is that the position the foot must assume when placed and held upon the accelerator or brake pedal by the seated driver of the vehicle. For example, the close proximity of the seat to the pedals in such a vehicle causes the seated driver, while driving the vehicle, to hold the foot at an acute angle in order to properly place it on the accelerator pedal and maintain best leverage. Holding the foot at such an angle for an extended period of time causes difficult strain on certain muscles of the foot and leg, resulting in fatigue and adversely effecting the safe operation of the vehicle. Also, the heel of the driver's foot, being held at such an acute angle for an extended time, will tend to slide back along the floor away from the pedal as a natural way of relieving the acute angle and fatigue, resulting in the foot being in a position that does not allow the optimum leverage point when resting on the pedal, therefore causing a potentially hazardous condition.

What is clearly needed is a method and apparatus that prevents the heel from sliding back, and also relieves the acute angle at which the foot is held, and the resulting muscle fatigue, when a driver while driving a recreational or similar large vehicle as previously described places the heel of the foot on the floor and the ball of the foot on a pedal as in the conventional manner.

SUMMARY OF THE INVENTION

In a preferred embodiment of the present invention an accelerator block for supporting a driver's foot in application to an accelerator pedal of a vehicle to provide an ergonomically desirable position is provided, comprising a body having a height for supporting the driver's foot above a floor of the vehicle immediately before the accelerator pedal; an interface for fastening the body to the floor, and a shoulder facing toward the accelerator for restraining the driver's foot from moving away from the accelerator. In some embodiments the shoulder is radiused concave toward the accelerator for restraining the driver's foot from moving laterally relative to the accelerator pedal.

In various embodiments the accelerator block may be a hollow unit fashioned of relatively thin-walled material, and may further comprise lines or grooves substantially parallel with a floor line, for aid in trimming a block to a desired height. The body may be rectangular or substantially cylindrical with a central cylindrical axis parallel with the height of the body. The block may be a hollow cylinder formed of a relatively thin-walled material.

In various embodiments the interface for fastening may take several different forms, such as screw holes for fastening screws. There may be, for example, one vertically-oriented hole for a sheet metal screw of sufficient length to pass through the body and fasten the body to the floor of the vehicle.

In an alternative embodiment, in a vehicle having an accelerator pedal and a floor before the accelerator pedal, a method is provided for providing an ergonomically advantageous position for a driver's foot and leg, comprising steps of (a) supporting the driver's foot in front of the accelerator pedal by placing a heel of the foot on an accelerator block fastened to the floor; and (b) cradling the heel against a shoulder on an upper surface of the accelerator block.

In still another embodiment a method for providing an ergonomically-advantageous position for a vehicle driver's foot and leg is disclosed, comprising steps of (a) fashioning an accelerator block with a body having a height for supporting the driver's foot above a floor of the vehicle immediately before an accelerator pedal; (b) fastening the body to the floor of the vehicle before the accelerator pedal; and (c) positioning a heel of the driver's foot on the accelerator block, thereby providing a larger angle between the driver's foot and leg than would attain without the presence of the block.

In this method there may be a step for retaining the driver's heel in a radiused shoulder, concave toward the accelerator, restraining the driver's foot from moving laterally relative to the accelerator pedal. The accelerator block in this method may be a hollow unit fashioned of relatively thin-walled material, and may have lines or grooves substantially parallel with a floor line, for aid in trimming a block to a desired height.

In some cases the body may be substantially cylindrical with a central cylindrical axis parallel with the height of the body. The cylindrical block may be a hollow cylinder formed of a relatively thin-walled material. The interface for fastening may comprise at least one vertically-oriented hole for a sheet metal screw of sufficient length to pass through the body and fasten the body to the floor of the vehicle.

In various embodiments of the invention, taught in enabling detail below, for the first time an apparatus and method is provided wherein a driver of a vehicle may have his or her foot supported relative to an accelerator pedal, such that the angle of the foot to the leg is ergonomically correct and comfortable.

BRIEF DESCRIPTION OF THE DRAWING FIGURES

FIG. 3a is a top view of the ergonomic device of FIG. 2.

FIG. 3b is an elevation view of the ergonomic device of FIG. 3a.

FIG. 4b is an elevation view of the ergonomic device of FIG. 4a.

DESCRIPTION OF THE PREFERRED EMBODIMENTS

Figure 1:
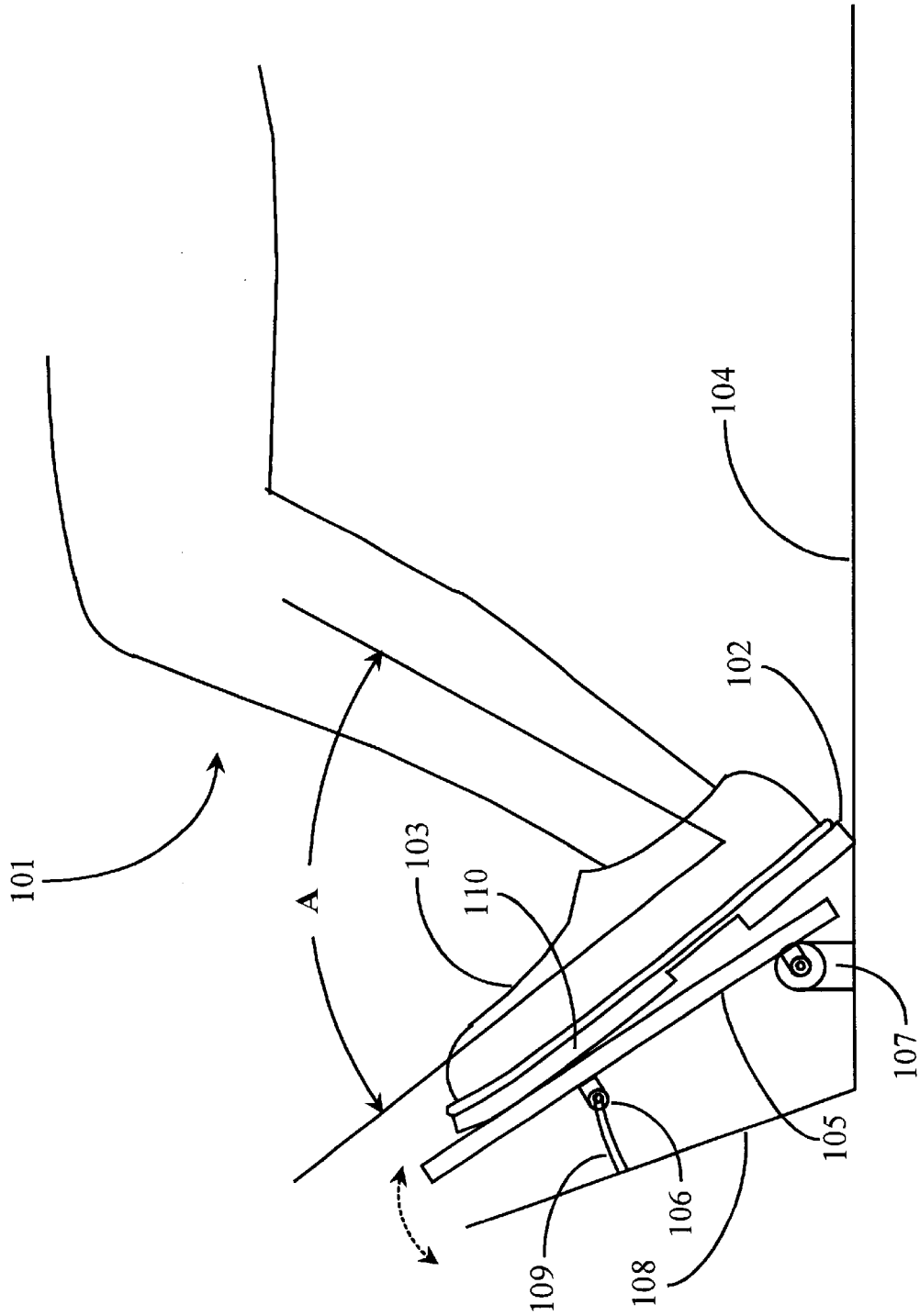
FIG. 1 is an elevation view of the leg and foot of a seated driver as held on a pedal as in a conventional driving position in the prior art.

FIG. 1 is an elevation view of the leg and foot of a seated driver as held on a pedal in a conventional driving position. The driver's seat (not shown) as well as other components not requiring description is not depicted to allow for an improved view of the more essential components described. As in a conventional driving position in a vehicle such as previously described, heel 102 of foot 103 is shown resting on floor 104, with sole 110 of foot 103 resting on pedal 105 in a position allowing for best leverage when pressure is applied to pedal 105. Pivot assembly 106 pivotally connects pedal 105 to pushrod 109. Pushrod 109 extends beyond firewall 108 through an opening (not shown) in firewall 108 and can be connected by various means to a control apparatus actuating an accelerator function of the vehicle for example, and typically has spring-loaded or other resistance qualities incorporated to cause a pedal such as pedal 105 to return to its original position once downward pressure is relieved. The lower portion of pedal 105 is pivotally connected to floor 104 by pivot assembly 107, and provides for the forward and backward motion created when pressure is applied to or released from pedal 105 by foot 103. The means by which pedal 105 is connected to pushrod 109 and floor 104 may vary.

In some implementations of accelerator pedals the pedal is hinged to the firewall instead of to the floor as shown. This is particularly true for many models of recreational vehicles to which the present invention pertains. The same is true regarding FIG. 2 described below.

Acute angle A represents the angle at which foot 103 is held in relation to leg 101 when placed upon pedal 105 in a typical driving position in a recreational vehicle or similar vehicle as previously described. Because of the shorter distance between pedal 105 and the drivers seat (not shown), typical in such a vehicle, it is necessary for a driver to hold foot 103 at an acute angle to leg 101 in order to obtain the best leverage point between foot 103 and pedal 105, resulting over an extended period of time, in strain and fatigue of the muscles used.

Figure 2:
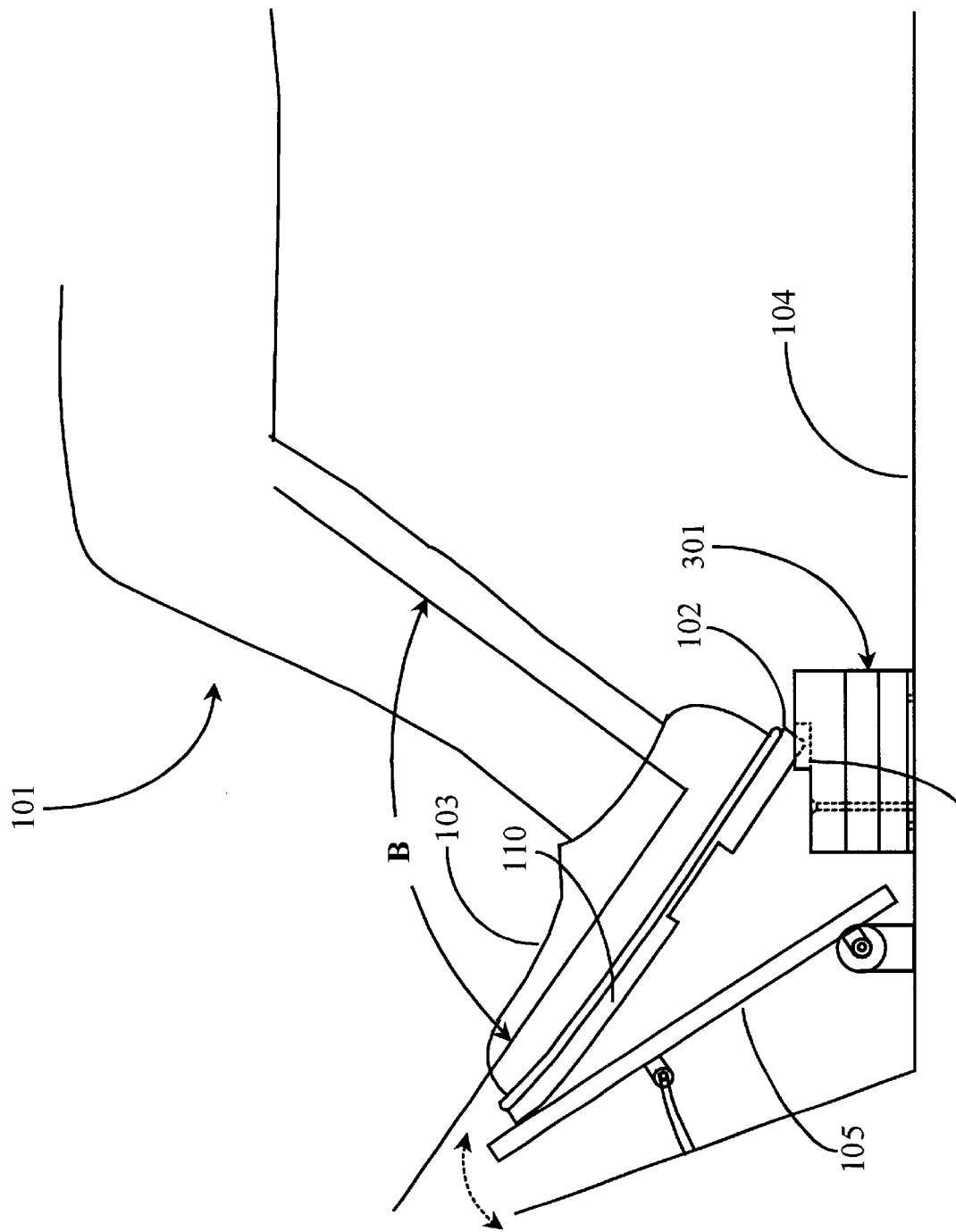
FIG. 2 is an elevation view of the leg and foot of FIG. 1 using an ergonomic device according to an embodiment of the present invention.

FIG. 2 is an elevation view of the leg and foot of a driver, similar to the view of FIG. 1, but using an ergonomic device according to an embodiment of the present invention. All components of FIG. 1 are shown in FIG. 2, with the addition of an ergonomic accelerator block 301 provided and used according to an embodiment of the present invention. Ergonomic accelerator block 301 is provided having a vertical height determined to be sufficient to support the foot at an elevation above the floor allowing for a more comfortable position when the heel of the foot is placed on top of accelerator block 301, and the sole of the foot is placed in the correct position on pedal 105. Obtuse angle B represents the angle at which foot 103, with heel 102 placed upon accelerator block 301 and sole 110 placed upon pedal 105, assumes in relation to leg 101. A driver holding a foot and leg at obtuse angle B will invariably experience greater comfort and less muscle fatigue over an extended period of time. Accelerator block 301 in a preferred embodiment utilizes a radiused shoulder 206 that, when heel 102 is placed thereon, and sole 110 is properly placed on pedal 105, prevents heel 102 from sliding back from pedal 105, in addition to limiting and restraining side-to-side movement of heel 102.

FIG. 3a is a top view of accelerator block 301 of FIG. 2. Accelerator block 301 is shown with radius 206 used to hold the heel of the foot in place when resting on the top. In this embodiment flanges 305 are provided on each side edge of accelerator block 301. Flanges 305 contain a plurality of holes 307 enabling the flanges to be fastened to the floor by screws for example, providing a means of fastening the entire accelerator block 301 to the floor of the vehicle. In this embodiment screw hole 323 is provided to allow the insertion of a larger center mounting screw (not shown), of a length slightly longer than the height of accelerator block 301. In this embodiment such an additional mounting method is used in conjunction with the aforementioned mounting method using holes 307 within flanges 305. The number, size, shape and location of mounting holes can vary in different embodiments of the present invention, or can be omitted altogether, as is true for screw hole 323. A wide variety of methods can be used in other embodiments of the present invention to mount accelerator block 301 to the floor of a vehicle, including clamping devices, Velcro fasteners, rivets and the like.

FIG. 3b is an elevation view of accelerator block 301 of FIG. 3a. The depth of radius 206 is shown in this view, as well as the length of holes 307 and screw hole 323. The depth of radius 206 can vary rather widely in different embodiments. In this embodiment ridges or grooves 325 are provided on both sides of accelerator block 301. The purpose of ridges 325 is to provide horizontal reference lines for a user to cut the block to different heights as may be needed for use with different vehicles and under various circumstances. In other embodiments the number, size, shape and location of ridges or grooves can vary greatly, or not be present at all.

Block 301 in FIGS. 3a and 3b is illustrated as a solid unit as may be cast or molded from polymeric material, or machined from a solid block of material. In other embodiments the block may be hollow, or may be a three-sided structure formed of relatively thin-wall material. It will be clear to the skilled artisan that such a block may be implemented in many different ways, all within the scope of the present invention. In the case of a hollow block fashioned of relatively thin walled material, grooves may be provided part way through a wall of the structure to aid in cutting a block to a lower height.

Figure 4A:
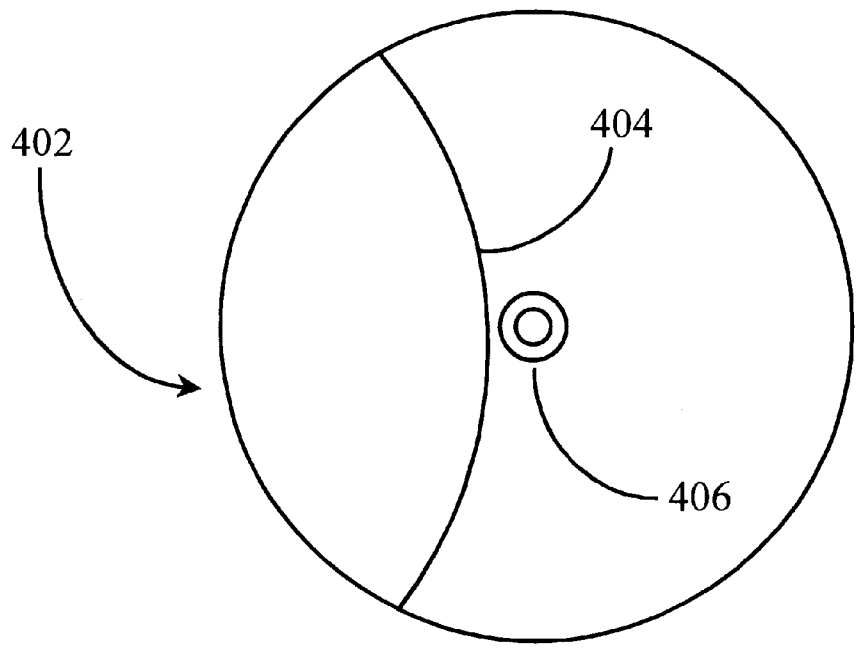
FIG. 4a is a top view of an ergonomic device according to an alternative embodiment of the present invention.

FIG. 4a is a top view of an accelerator block 402 according to another embodiment of the present invention. Accelerator block 402 is provided as cylindrical in shape and of similar height to that of accelerator block 301 of FIG. 2. A radiused shoulder 404, similar to radiused shoulder 206 of accelerator block 301 is utilized in this embodiment for the purpose of providing a shoulder in which to rest the heel of the driver's foot and prevent it from sliding back while driving. A screw hole 406 is also used in this embodiment similarly to that of accelerator block 301 for the purpose of mounting the device to the floor of the vehicle.

Figure 4B:
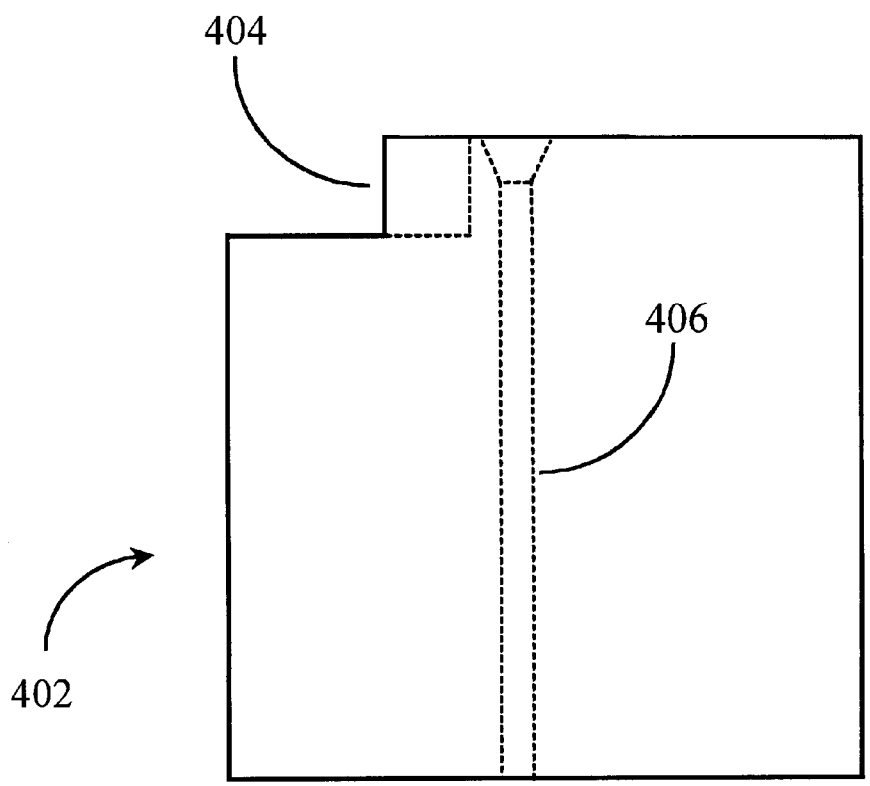

FIG. 4b is an elevation view of accelerator block 402 of FIG. 4a. In this view the depth of radius 404 and length of screw hole 406 can be seen. Again, accelerator block 402 is shown as a sold unit, but may in other embodiments be hollow or structured in any one of many ways, and fastening elements and methods may vary as well. The size, shape, materials and method of manufacture may vary greatly in different embodiments of an ergonomic accelerator block according to various embodiments of the present invention, as can the method utilized for mounting to the floor of the vehicle.

It will be apparent to one with ordinary skill that the method and apparatus of the present invention may be practiced in any vehicle with attributes that contribute to an undesirable foot position while driving, without departing from the spirit and scope of the present invention. It will also be apparent to one with ordinary skill that the present invention may be modified in dimensional size and profile shape to fit any user situation. For these reasons the method and apparatus of the present invention should be afforded the broadest possible scope. The spirit and scope of the present invention should be limited only by the claims that follow.

What is claimed is:

1. An accelerator block for supporting a driver's foot in an ergonomically desirable position, comprising:

a body having a height for supporting the driver's foot above a floor of a vehicle immediately before an accelerator pedal, the body in the shape of a cylinder with a central cylindrical axis parallel with the height of the body; and comprising grooves substantially parallel with a floor line, for aiding in trimming of the body to a desired height;

an interface on the center axis of the cylinder for fastening the body to the floor; and a shoulder integrally molded into the body, the shoulder facing toward the accelerator for restraining the driver's foot from moving away from the accelerator.

2. The accelerator block of claim 1 wherein the shoulder is radiused concave toward the accelerator for restraining the driver's foot form moving laterally relative to the accelerator pedal.

3. The accelerator block of claim 1 wherein the body comprises a substantially hollow interior.

4. A method for providing an ergonomically-advantageous position for a vehicle driver's foot and leg, comprising steps of:

(a) fashioning an accelerator block with a body in the shape of a cylinder having a height for supporting the driver's foot above a floor of a vehicle immediately before an accelerator pedal, with a central cylindrical axis parallel with the height of the body and a shoulder facing toward the accelerator pedal, the shoulder integrally molded with the body for restraining a driver's foot, the body further comprising grooves substantially parallel with a floor line, for aiding in trimming of the body to a desired height;

(b) fastening the body to the floor of the vehicle before the accelerator pedal, through an interface on the center axis of the cylinder; and (c) positioning a heel of the driver's foot in the shoulder on the accelerator block, thereby providing a larger angle between the driver's foot and leg than would attain without the presence of the block.

5. The method of claim 4 wherein the cylindrical block comprises a substantially hollow unit.

6. The method of claim 4 wherein the interface for fastening comprises at least one vertically-oriented hole for a sheet metal screw of sufficient length to pass through the body and fasten the body to the floor of the vehicle.

7. An accelerator block for supporting a driver's foot in an ergonomically desirable position, comprising:

a body having a base, a top area, substantially vertical sides, and a height for supporting the driver's foot above a floor of a vehicle immediately before an accelerator pedal, the body incorporating grooves in the substantially vertical sides, the grooves parallel to the base, as guides in trimming the height of the body;

an interface for fastening the body to the floor; and a shoulder integrally formed in the body, facing toward the accelerator for restraining the driver's foot from moving away from the accelerator.

8. The accelerator block of claim 7 wherein the body is hollow.

\* \* \* \* \*